United States Patent Office 3,420,894
Patented Jan. 7, 1969

---

3,420,894
PROCESS FOR THE PREPARATION OF BISPHENOLS
Arleen Cecilia Pierce, Belleville, and Neil Adams Lindo, New Providence, N.J., assignors to Allied Chemical Corporation, New York, N.Y., a corporation of New York
No Drawing. Filed Feb. 26, 1965, Ser. No. 435,724
U.S. Cl. 260—619                    8 Claims
Int. Cl. C07c 37/20; C07c 39/24

---

ABSTRACT OF THE DISCLOSURE

This specification discloses an improved process for the preparation of 2,2-bis(4'-hydroxyphenyl)-1,1a,3,3a,4,5,5,5a,5b,6 - decachlorooctahydro - 1,3,4 - metheno-2H-cyclobuta [cd] pentalenes whereby 1,1a,3,3a,4,5,5,5a,5b,6-decachlorooctahydro-1,3,4 - metheno-2H-cyclobuta [cd] pentalene-2-one is reacted with a phenolic compound in the presence of a sulfonic acid catalyst at elevated temperatures. High yields of pure bisphenols are obtained.

---

These bisphenols and a process for their preparation are disclosed and claimed in co-pending U.S. application, Ser. No. 435,723, now U.S. Patent No. 3,370,086, filed in the names of E. E. Gilbert and P. Lombardo.

The process disclosed and claimed for the preparation of the subject bisphenols in the aforesaid application comprises reacting $C_{10}Cl_{10}O$ ketone (1,1a,3,3a,4,5,5,5a,5b,6-decachlorooctahydro - 1,3,4 - metheno-2H-cyclobuta [cd] pentalene-2-one) with a phenolic compound in the presence of a Lewis acid as catalyst, for example boron trifluoride. While this process is adequate for preparing the subject bisphenols, boron trifluoride is a relatively expensive catalyst and the process yield and quality leave something to be desired.

It is the principal object of the present invention to provide an improved process for the economical preparation of 2,2-bis(4'-hydroxyphenyl)-1,1a,3,3a,4,5,5,5a,5b,6-decachlorooctahydro-1,3,4 - metheno-2H-cyclobuta [cd] pentalene and its derivatives, hereinafter simply referred to as DCMP bisphenols, in high yield and purity. It is a further object of the present invention to provide such a process utilizing a sulfonic acid as catalyst. Other advantages of the present invention will be apparent from the following description.

In accordance with the present invention, DCMP bisphenols of the formula:

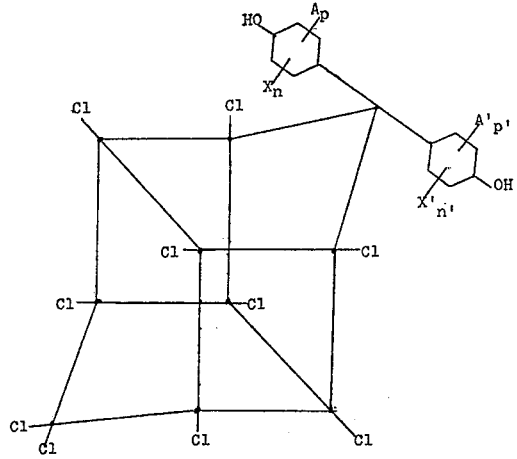

wherein each node represents a tetravalent carbon atom, A, A', X, X' represent substitutes for the hydrogens in a position ortho to the phenolic hydroxyl group; A and A' are alkyl having 1 to 3 carbon atoms; X and X' are halogens independently selected from the group consisting of chlorine and bromine; $n$ and $n'$ are integers from 0 to 2; $p$ and $p'$ are integers from 0 to 2; the sum of $n$ and $p$ being less than 3; the sum of $n'$ and $p'$ being less than 3; which comprises reacting $C_{10}Cl_{10}O$ ketone having the formula:

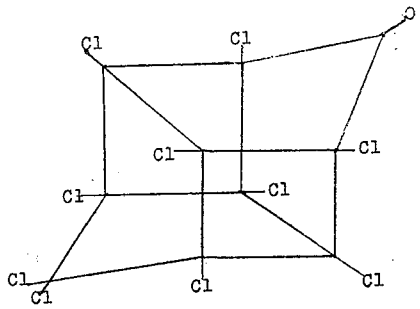

or a hydrate thereof, with a phenolic compound having a free para position, of the formula:

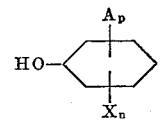

wherein A, X, $n$ and $p$, are as defined above, in the presence of an acid catalyst having the formula:

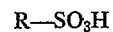

wherein R is a radical selected from the group consisting of hydroxyl and substituted and non-substituted alkyl, aryl, alkylaryl and aralkyl, at a temperature above about 100° C., and except when R is hydroxyl, above about 140° C. Temperatures up to 250° C. can be employed.

The DCMP bisphenols of the present invention have been found to be eminently useful as intermediates in the preparation of polycarbonate resins. Briefly the process for these polycarbonates comprises reacting the subject DCMP bisphenols with phosgene in a basic medium.

$C_{10}Cl_{10}O$ ketone, hereinafter simply referred to as DCMP, is commercially available in hydrated form under the trademark "Kepone," from Allied Chemical Corporation, and is a white solid which melts with decomposition at about 360° C. This compound and its preparation are disclosed in U.S. Patents Reissues 24,435 and 24,749.

The phenolic reactant utilized in preparing DCMP bisphenols may be selected from a wide and varied group. Illustrative of suitable phenolic reactants are the following: phenol, o-cresol, 2-ethyl phenol, 2,6-dimethyl phenol, 2-methyl-6-ethyl phenol, 2-isopropyl phenol, 2,6-diisopropyl phenol, 2-n-propyl phenol, 2,6-dichloro phenol, 2-bromo phenol, 2-chloro-6-methyl phenol, 2-bromo-6-isopropyl phenol mixtures thereof and the like.

The process of the present invention involves a sulfonic acid as catalyst. Generally speaking, any sulfonic acid stable under the conditions of reaction may be successfully employed. Illustrative of aliphatic sulfonic acids are: methane sulfonic, ethane sulfonic, propane sulfonic, hexane sulfonic, nonane sulfonic, 3-chloropentane sulfonic, 3-methyl dodecane sulfonic, 3,6-dibromodecane sulfonic mixtures thereof and the like.

Similarly, aromatic sulfonic acids are illustrated by: benzene sulfonic, toluene sulfonic, xylene sulfonic, 2-chloro-benzene sulfonic, 3-ethyl-benzene sulfonic, 2,6-dibromo-naphthalene sulfonic, dodecyl-benzene sulfonic, 4-methyl-naphthalene sulfonic mixtures thereof and the like.

It should be noted that sulfuric acid may also be successfully employed in the process of the present invention; it is believed to react with the phenolic reactant to form a phenol sulfonic acid in situ.

Of the previously enumerated sulfonic acid catalysts, the para isomer of toluene sulfonic acid is preferred since it exhibits unusual stability under the conditions of reaction, is commercially available, and does not necessitate employment of special operating equipment or extensive precautionary procedures due to its inherent non-corrosiveness and its ease of removal from the reaction mixture. This latter advantage is of substantial significance since it directly affects the purity of the resulting DCMP bisphenol.

When a sulfonic acid other than sulfuric acid is employed, it has been found that if that condensation is attempted at reaction temperatures below about 40° C. a tertiary alcohol having only one hydroxyphenyl substituent is obtained to a considerable extent instead of the desired bisphenol. Reaction temperatures up to the boiling point of the reaction mixture may be employed and, in preferred operation, temperatures within the range of about 140° to 180° C. are employed.

The employment of sulfuric acid as catalyst allows the use of lower reaction temperatures i.e., 100° C. and above, without realizing a significant decrease in product yield or purity.

The amount of catalyst present during reaction is not critical. However, about 0.5 to 20 percent by weight, preferably 2 to 5 percent by weight, of the total amount of reactants may be utilized. Reaction times may vary over a wide range of about 1 to 100 hours and preferably 5 to 20 hours.

Similarly, the molar ratio of reactants is not critical; however, it is preferred to utilize an excess of phenolic reactant rather than the stoichiometric amount of 2 mols phenolic reactant per mol DCMP. In preferred operation, molar ratios of from about 10 to 20 mols phenolic reactant per mol DCMP are employed.

If desired, a solvent for the reactants may be employed, provided that it is inert under the conditions of reaction. The amount of solvent is not critical but in practice from about 1 to 20 parts solvent per part phenolic reactant may be employed. Illustrative of suitable solvents are mesitylene, 1,2 dichlorobenzene, nitrobenzene and the like.

The resulting DCMP bisphenol may be recovered by conventional procedures, for example, distilling off excess reactant and solvent, water-washing the crude DCMP bisphenol and drying.

In preferred operation, from about 10 to 20 mols phenolic reactant are admixed with one mol DCMP and the resulting mixture heated to a temperature of about 140° to 180° C. in the presence of from about 2 to 5 percent p-toluene sulfonic acid based on the total weight of the reactants. The reaction mixture is heated about 5 to 20 hours and, at the end of this period, the reaction mixture is poured into an equal volume of hot water to effect precipitation and the resulting crude bisphenol is separated by filtration. Purification comprises recrystallization from a suitable solvent such as aqueous methanol followed by filtration and drying.

The following examples are given for the purpose of illustrating the present invention. In the examples parts are by weight.

Example I

To a reaction vessel equipped with a thermometer, stirrer, condenser and inlet tube was charged a mixture comprising 12.25 parts (0.024 mol) of DCMP hydrate (0.002 mol $H_2O$) and 22.56 parts of (0.24 mol) of phenol. The resulting reaction mixture was heated to a melt at about 80° C. and 0.7 part of p-toluene sulfonic acid was added. The resulting mixture was heated at a temperature range of 165°–175° C. with stirring for a period of 9 hours. The mixture was then poured into 350 parts of hot water to precipitate out of solution the resulting DCMP bisphenol. 14.8 parts corresponding to a yield of 94% of theory were finally isolated by suction filtration. The product was thereafter purified by boiling in water, recovered by suction filtration and recrystallized from 90% aqueous methanol at reflux temperature. Additional washings with 75% aqueous methanol, yielded purified DCMP bisphenol having a decomposition point of 301°–302° C.

Elemental analysis showed 40.1% carbon, 1.60% hydrogen and 53.3% chlorine which is in excellent agreement with the theoretical values of 40.0% carbon, 1.51 hydrogen and 53.6 chlorine.

Example II

To the reaction vessel of example I was charged a mixture comprising 153 parts (0.3 mol) of DCMP hydrate, 366 parts (3.0 mols) of 2,6-xylenol and 10.4 parts (2.0% by weight of reactants) of p-toluene sulfonic acid followed by heating at a temperature range of 170–185° C. for a period of 7 hours. 1000 parts of carbon tetrachloride were then added to effect precipitation out of solution of the resulting 2,2-bis(2′,6′-dimethyl-4′-hydroxyphenyl)-1, 1a,3,3a,4,5,5,5a,5b,6 - decachloro - 1,3,4 - metheno-2H-cyclobuta [cd] pentalene. Recrystallization from acetic acid yielded the reaction product as white needles having a decomposition point of 290–312° C.

Elemental analysis showed 43.9% carbon, 2.63% hydrogen and 49.5% chlorine which is in excellent agreement with the theoretical values of 43.5% carbon, 2.51% hydrogen and 49.5% chlorine.

The procedure set forth in Example I was repeated with noted exceptions, the results of which are contained in Table I set forth below:

TABLE I

| Example | Catalyst | Amount, Percent by weight [1] | Temperature, °C. | Molar ratio phenol:DCMP | Reaction time, hrs. | Yield, percent of theory | Purified yield, percent |
|---|---|---|---|---|---|---|---|
| 3 | Sulfuric acid | 5 | 105–120 | 6:1 | 70 | 84 | 70 |
| 4 | do | 3.7 | 150 | 20:1 | 17 | 89 | 83 |
| 5 | p-Toluene sulfonic acid | 3 | 140 | 20:1 | 14 | 95 | 84 |
| 6 | do | 5 | 172–174 | 10:1 | 8 | 93 | 85 |
| 7 | do | 2 | 140–150 | 10:1 | 9 | 100 | 80 |
| 8 | do | 0.5 | 165–172 | 10:1 | 9 | ([2]) | 82 |
| 9 | do | 2 | 165–170 | 10:1 | 6 | 97 | 70 |

[1] Based on the total weight of the reactants.
[2] Not determined.

The identical procedure and reaction conditions employed in Example 7 were repeated with the sole exception of employing a reaction temperature of 132° C. A product yield of less than 20% DCMP bisphenol was obtained which is in sharp contrast to the 100% product yield obtained in Example 7.

When 2,6-dibromophenol is utilized as phenolic reactant under the conditions of the present invention the resulting bisphenol, i.e., 2,2-bis(3′,5′-dibromo-4-hydroxyphenyl) 1,1a,3,3a,4,5,5,5a,5b,6-decachlorooctahydro-1,3,4-metheno-2H-cyclobuta [cd] pentalene is obtained.

It is to be understood that the foregoing is by way of illustration and that changes and modifications may be made within the scope of the appended claims without departing from the spirit of the invention.

We claim:
1. A process for the preparation of a bisphenol having the structural formula:

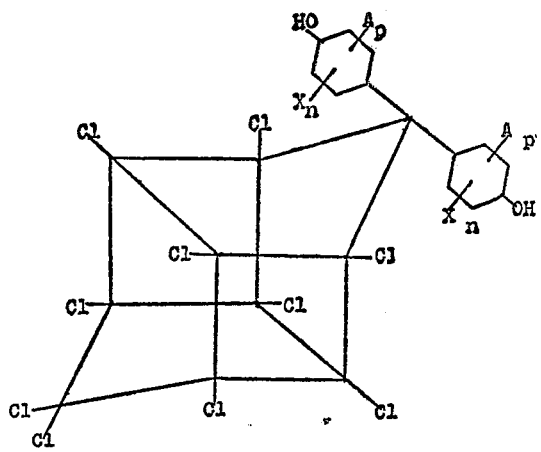

wherein A and X are independently at each occurrence substituents for hydrogens in a position ortho to the phenolic hydroxyl groups A is alkyl having 1 to 3 carbon atoms, X is halogen selected from the group consisting of chlorine and bromine; $n$ is an integer from 0 to 2; $p$ is an integer from 0 to 2; the sum of $n$ and $p$ being less than 3; which comprises reacting 1,1a,3,3a,4,5,5,5a,5b,6-decachlorooctahydro-1,3,4-metheno-2H - cyclobuta[cd]pentalene-2-one having the structural formula:

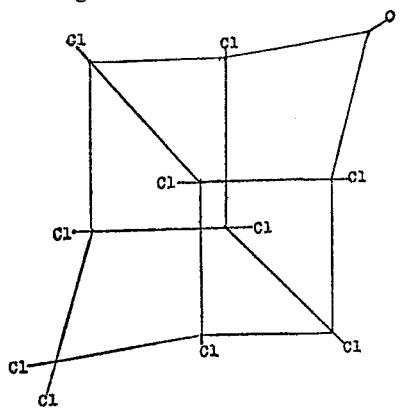

with at least two moles of a phenolic reactant having a free para position of the formula:

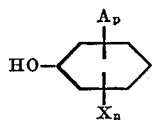

wherein A, X, $n$ and $p$ are as defined above or a mixture of two such phenols, in the presence of an acid having the formula:

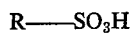

wherein R is a radical selected from the group consisting of substituted and non-substituted alkyl, alkaryl, aryl and aralkyl at a temperature above about 140° C.

2. A process in accordance with claim 1, wherein the phenolic reactant is phenol.
3. A process in accordance with claim 1, wherein the phenolic reactant is 2,6-xylenol.
4. A process in accordance with claim 1, wherein the sulfonic acid is p-toluene sulfonic acid.
5. A process in accordance with claim 1, wherein the reaction temperature is within the range of from about 140°–180° C.
6. A process in accordance with claim 1, wherein the molar ratio of the reactants is from about 10 to 20 mols phenolic reactant per mol 1,1a,3,3a,4,5,5,5a,5b,6-decachlorooctahydro - 1,3,4 - metheno - 2H - cyclobuta[cd] pentalene-2-one.
7. A process in accordance with claim 1, wherein the amount of sulfonic acid employed is from about 2 to 5% by weight of the total amount of the reactants.
8. A process for the preparation of 2,2-bis(4'-hydroxyphenyl) - 1,1a,3,3a,4,5,5,5a,5b,6 - decachlorooctahydro-1,3,4-metheno-2H-cyclobuta[cd]pentalene which comprises reacting 1,1a,3,3a,4,5,5,5a,5b,6-decachlorooctahydro-1,3,4-metheno-2H-cyclobuta[cd]pentalene-2-one with phenol in a molar ratio of from about 10 to 20 mols phenol per mol 1,1a,3,3a,4,5,5,5a,5b,6-decachlorooctahydro-2H-cyclobuta[cd] pentalene-2-one at a temperature selected from the range of from about 140–180° C. in the presence of p-toluene sulfonic acid in an amount of from about 2 to 5% by weight based on the total amount of the reactants for a reaction time of from about 5 to 20 hours and thereafter recovering the resulting bisphenol.

References Cited

UNITED STATES PATENTS 3,185,736   5/1965   Ellingboe _____ 260—619
3,317,466   5/1967   Caldwell et al. _____ 260—619

LEON ZITVER, Primary Examiner.

H. ROBERTS, Assistant Examiner.

U.S. Cl. X.R.

260—047